United States Patent
Sztuk et al.

(10) Patent No.: US 9,836,639 B2
(45) Date of Patent: Dec. 5, 2017

(54) SYSTEMS AND METHODS OF LIGHT MODULATION IN EYE TRACKING DEVICES

(71) Applicant: Facebook, Inc., Menlo Park, CA (US)

(72) Inventors: Sebastian Sztuk, Copenhagen N. (DK); Martin Henrik Tall, Frederiksberg C. (DK); Javier San Agustin Lopez, Copenhagen S (DK)

(73) Assignee: Facebook, Inc., Menlo Park, CA (US)

( * ) Notice: Subject to any disclaimer, the term of this patent is extended or adjusted under 35 U.S.C. 154(b) by 170 days.

(21) Appl. No.: 14/593,796

(22) Filed: Jan. 9, 2015

(65) Prior Publication Data
US 2015/0199559 A1    Jul. 16, 2015

Related U.S. Application Data

(60) Provisional application No. 61/926,077, filed on Jan. 10, 2014.

(51) Int. Cl.
*H04N 9/47* (2006.01)
*G09G 5/00* (2006.01)
(Continued)

(52) U.S. Cl.
CPC ......... *G06K 9/00255* (2013.01); *G06F 3/013* (2013.01); *G06K 9/00604* (2013.01);
(Continued)

(58) Field of Classification Search
CPC ............... G06K 9/00255; G06T 7/004; G06T 2207/10004
See application file for complete search history.

(56) References Cited

U.S. PATENT DOCUMENTS 4,623,234 A    11/1986    Shimizo et al.
5,268,730 A    12/1993    Takagi
(Continued)

FOREIGN PATENT DOCUMENTS

EP    2 587 341 A1    5/2013

OTHER PUBLICATIONS

Dachis, Adam, "Basics of Photography: Your Camera's Manual Settings", [Online]. Retrieved from the Internet: <URL: http://lifehacker.com/5814173/basics-of-photography-your-cameras-man . . . , (Jun. 22, 2011), 1-67.

(Continued)

*Primary Examiner* — Tsion B Owens
(74) *Attorney, Agent, or Firm* — Fenwick & West LLP

(57) ABSTRACT

An image of a user's eyes and face may be analyzed using computer-vision algorithms. A computing device may use the image to determine the location of the user's eyes and estimate the direction in which the user is looking. The eye tracking technology may be used in a wide range of lighting conditions and with many different and varying light levels. When a user is near a light source, an automatic exposure feature in the camera may result in the user's face and eyes appearing too dark in the image, possibly reducing the likelihood of face and eye detection. Adjusting attributes such as the camera exposure time and the intensity and illumination interval of the light sources based on motion and light levels may improve detection of a user's features.

20 Claims, 11 Drawing Sheets
(3 of 11 Drawing Sheet(s) Filed in Color)

(51) Int. Cl.
*G06K 9/00* (2006.01)
*G06F 3/01* (2006.01)
*H04N 5/232* (2006.01)
*H04N 5/235* (2006.01)
*G06T 7/70* (2017.01)

(52) U.S. Cl.
CPC .............. *G06T 7/70* (2017.01); *H04N 5/2327* (2013.01); *H04N 5/2353* (2013.01); *H04N 5/23219* (2013.01); *H04N 5/23241* (2013.01); *H04N 5/23258* (2013.01); *G06T 2207/10004* (2013.01); *G06T 2207/30201* (2013.01)

(56) References Cited

U.S. PATENT DOCUMENTS

| | | | | |
|---|---|---|---|---|
| 8,339,506 B2* | 12/2012 | Hung | ................ | H04N 5/23219 348/363 |
| 8,577,096 B2* | 11/2013 | Shiraishi | ............ | G06K 9/00228 382/118 |
| 9,041,787 B2* | 5/2015 | Andersson | .............. | G06F 3/013 348/61 |
| 9,329,684 B2* | 5/2016 | Horesh | ................... | G06F 3/013 |
| 2011/0228975 A1* | 9/2011 | Hennessey | ............ | A61B 3/113 382/103 |
| 2013/0050462 A1* | 2/2013 | Watanabe | .............. | G03B 15/02 348/77 |
| 2013/0106681 A1* | 5/2013 | Eskilsson | ............ | G06K 9/00597 345/156 |
| 2013/0127980 A1* | 5/2013 | Haddick | ................. | G06F 3/013 348/14.08 |
| 2013/0135196 A1* | 5/2013 | Park | ........................ | G06F 3/01 345/156 |
| 2013/0135198 A1 | 5/2013 | Hodge et al. | | |
| 2014/0239848 A1 | 8/2014 | Bradford | | |
| 2014/0351926 A1* | 11/2014 | McCloskey | ........... | G06F 21/316 726/19 |
| 2015/0085250 A1* | 3/2015 | Larsen | ............... | G06K 9/00604 351/206 |

OTHER PUBLICATIONS

PCT International Search Report and Written Opinion, PCT Application No. PCT/IB2015/000408, dated Sep. 29, 2015, 11 pages.

* cited by examiner

SYSTEMS AND METHODS OF LIGHT MODULATION IN EYE TRACKING DEVICES

CROSS-REFERENCE TO RELATED APPLICATIONS

This application claims the benefit of U.S. Provisional Application No. 61/926,077, filed Jan. 10, 2014, entitled "Systems and Methods of Light Modulation in Eye Tracking Devices," which is incorporated herein by reference in its entirety.

TECHNICAL FIELD

The present disclosure generally relates to eye tracking and, more specifically, to systems and methods of facilitating light modulation in eye tracking devices.

BACKGROUND

A gaze of a user may be determined using eye tracking technology that determines the location of the user's gaze based on eye information present in images of the user's eyes or face. Poor image quality may contribute to erroneous eye tracking.

Camera control software may detect poor image quality on an entire captured image and automatically adjust various camera exposure values in an attempt to improve the quality of the image. These automatic adjustments may serve to reduce the quality of the image for the purposes of eye tracking.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are illustrated by way of example and not of limitation in the figures of the accompanying drawings.

DETAILED DESCRIPTION

Figure 1:
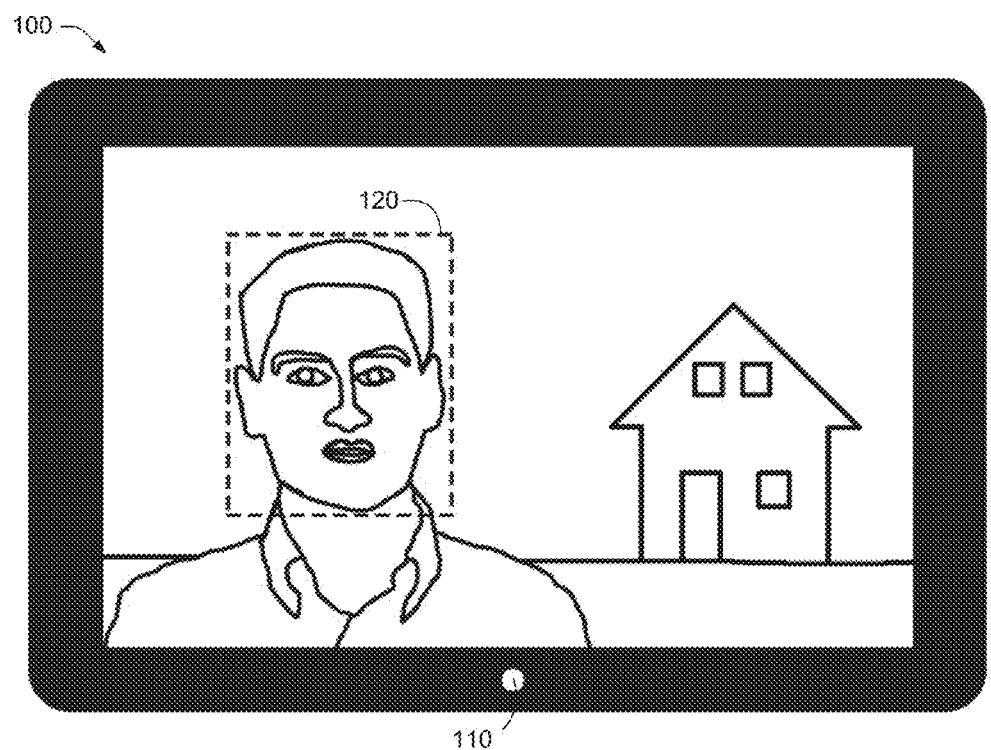
FIG. 1 is a device diagram of an example computing device capable of facilitating eye tracking control, according to some embodiments.

Example systems and methods to facilitate light modulation in eye tracking devices are described. In the following description, for purposes of explanation, numerous specific details are set forth in order to provide a thorough understanding of example embodiments. It will be evident, however, to one skilled in the art, that the present technology may be practiced without these specific details.

A user of a computing device may interact with and control objects and applications displayed on the computing device through the user's eye movement. An image of the user's eyes or face, captured by one or more front-facing cameras on or coupled to the computing device, may be analyzed using computer-vision algorithms, such as, for example, eye tracking algorithms and gaze detection algorithms. For example, the captured images may be processed to extract information relating to features of the user's eyes or face. The computing device may then use the extracted information to determine the location of the user's eyes and estimate the direction in which the user is looking (e.g., gaze direction), the location on the display at which the user is looking, or both. The user's point of regard is the point at which the user's eyes are focused, as interpreted by the computing device. For example, a line beginning at the user's eye and heading in the direction of the user's gaze may be intersected with a plane of a display to determine a point of regard on the display. As another example, lines beginning at each of a user's eyes may be traced until they intersect to determine a point of regard in space.

Using the gaze direction or point of regard, the computing device may be able to estimate at which icon on the display the user is looking. The estimation of where the user is looking may be used to direct one or more objects, applications, and the like to perform a particular operation. For example, the user may direct and control the movement of an object on the screen depending on where the user is looking on the display of the computing device, including the movement of objects in a virtual game. As another example, displayed information may be scrolled based on the location the user is viewing.

The eye tracking technology may be used in a wide range of lighting conditions and with many different and varying light levels. For example, the eye tracking technology may be used to detect a user's gaze even if there are one or more light sources near or around the user (e.g., a window behind the user, spotlights in the ceiling, when the user is in a dark room, etc.). In some embodiments, the eye tracking technology may be used through a mobile device.

The automatic exposure feature in many cameras automatically corrects the exposure of the entire image. When a user is near or around one or more light sources, the automatic exposure features in the camera may result in the user's face or eyes appearing too dark in an image, possibly reducing the likelihood of face and eye detection.

In some embodiments, an eye tracking device may employ active illumination (e.g., in the form of infrared light-emitting diodes (LEDs)). However, employing active illumination may reduce the battery life of the device. Under some circumstances (e.g., in a dark environment), the light intensity may be excessive and could be reduced, thereby reducing energy consumption and extending the battery life of the device.

To resolve the lighting issues associated with the one or more cameras used in eye tracking technology, an algorithm may be used to adjust one or more camera attributes, and/or the intensity of the light sources, in a continuous manner based on one or more parameters of the image to be taken, such as facial features, intensity level of the face region, contrast between pupil and iris of the user, intensity of corneal reflections, ambient light intensity, or any suitable combination of these. A camera attribute is any attribute that affects the images captured by the camera. Example camera attributes include exposure time, camera gain, camera f-number, and camera frame rate. An eye feature is any separately identifiable portion of the image of the eye captured in an image used for eye tracking. Example eye features include the pupil, the iris, and reflected glints from light sources.

Adjusting attributes such as the camera exposure time and/or the intensity and illumination interval of the light sources based on such parameters may improve detection of a user's features, such as a user's face, eye region, or eye features, in situations where there may be lighting issues, such as a bright background behind the user. In eye tracking systems that employ active infrared illumination, these techniques may also conserve battery life by reducing the intensity of the infrared light when the algorithm determines that tracking may be optimal with less light emitted by the light sources. Further, battery life may also be conserved by increasing the intensity of the infrared light when the sensor is capturing a frame or a specific area of the frame, and reducing it otherwise. One of ordinary skill in the art will appreciate that any suitable illumination may be used (e.g., infrared LEDs, lasers, etc.).

The exposure time, gain, brightness, frame rate, resolution, or any combination of these, of the cameras may be adjusted based on the brightness and contrast levels of the one or more facial features detected by the eye tracking software for a given image. For example, the eye tracking software may find the location and size of the face of the user and use information extracted from that region of the image (e.g., average intensity level of the one or more channels of the image) to adjust the exposure time in order to improve the image conditions on the face region. In another example, the eye tracking software may detect the one or more pupils and irises and may adjust the camera exposure time based on the contrast between pupils and irises in order to optimize detection in subsequent images.

In some example embodiments, the eye tracking software may combine the face and eye information with information provided by one or more sensors in a device, such as an ambient light sensor, a motion sensor, a proximity sensor, or any combination of these, to adjust the camera exposure time. For instance, if a light sensor indicates a low ambient light level, the exposure time of the one or more cameras may be increased so that more light reaches the sensor and contrast is better. When ambient light increases, the exposure time may be reduced to prevent over exposing the image. As another example, if a motion sensor indicates that the device movement is above a given threshold, the exposure time of the one or more cameras may be reduced in order to avoid blurry images, gain may be increased, frame rate may be adjusted, or any suitable combination thereof.

FIG. 1 is a device diagram of an example computing device 100 capable of facilitating eye tracking control. The computing device 100 may be any type of computing device, including, but not limited to, a smart phone, a personal digital assistant (PDA), a mobile phone, a computing tablet, an electronic reader, a television, a laptop, a desktop computer, a display, and the like. While eye tracking control is described throughout the description, one of ordinary skill in the art will appreciate that the example computing device 100 may be used passively to record the eye movement of a user without the user actively interacting with the computing device 100 (e.g., to facilitate a usability study or to determine the drowsiness level of a driver in a vehicle).

The computing device 100 may include a camera module 110. The camera module 110 may include one or more front-facing cameras placed in any suitable location in any manner within the computing device 100 (e.g., tilted at an angle such that it points toward the user's face) and may be used to capture images of the user's eyes or face. In some embodiments, the camera module 110 on the computing device 100 may be used in combination with one or more external camera modules that are external to the computing device 100. The camera module 110 may include a black and white (e.g., monochrome) or color (e.g., red-green-blue (RGB)) complementary metal-oxide-semiconductor (CMOS) sensor, running at an appropriate frame per second rate (e.g., high-definition at 30 frames per second), a lens with an appropriate field of view and depth of field (e.g., approximately 30-80 cm for a mobile device, approximately 2-5 meters for a television, etc.), or any suitable combination thereof.

The field of view and depth of view of the lenses of the one or more cameras in the camera module 110 may allow the user to move around, thereby accommodating for head pose variance of the user. The computing device 100 may use eye tracking control software to analyze the images taken by the camera module 110 and provide coordinates (e.g., two-dimensional/x,y coordinates or three-dimensional/x,y,z coordinates) of where the user is looking on the display of the computing device 100. The coordinates may be used for any number of applications (e.g., scrolling, moving objects, selecting icons, playing games, or any suitable combination thereof).

The camera module 110 may be turned on and/or off in any manner, such as by utilizing an external slider, an on-off dedicated button on the computing device 100, an application or a digital button on the screen, or the camera module 110 may be controlled by movement or shaking of the computing device 100, controlled by voice commands, on-screen capacitive buttons, touch pads, bio-signals (e.g., electromyography (EMG), electroencephalogram (EEG), etc.), remote wireless control, or any suitable combination thereof. As such, in some embodiments, the eye tracking components may consume power only while the camera is turned on (e.g., when the user is using the eye tracking features).

The images captured by the camera module 110 may be rotated. The eye tracking software may use sensors on the computing device 100 (e.g., accelerometer, magnetometer, etc.) to detect the orientation of the computing device 100 and rotate the images taken by the one or more cameras in camera module 110 accordingly so that they can be properly processed.

The images captured by the camera module 110 may include the user's face region 120, as well as other elements present in the background, as shown in FIG. 1. In images with bright backgrounds, a standard auto exposure algorithm may produce images where the user's face is dark, and eye features may be difficult to detect by an eye tracking system, thus having a negative impact on eye tracking robustness. In order to improve the detection of eye features by the eye tracking technology of the computing device 100, the eye tracking device may adjust different camera attributes with the objective of optimizing image quality around the face region 120. This may include optimizing image quality around the face region 120 while disregarding other portions of the image. The user's face region 120 may be detected in the image using any suitable algorithm (e.g. Viola and Jones) and may be tracked over time using any suitable algorithm, such as mean-shift or Lucas-Kanade.

Figure 2:
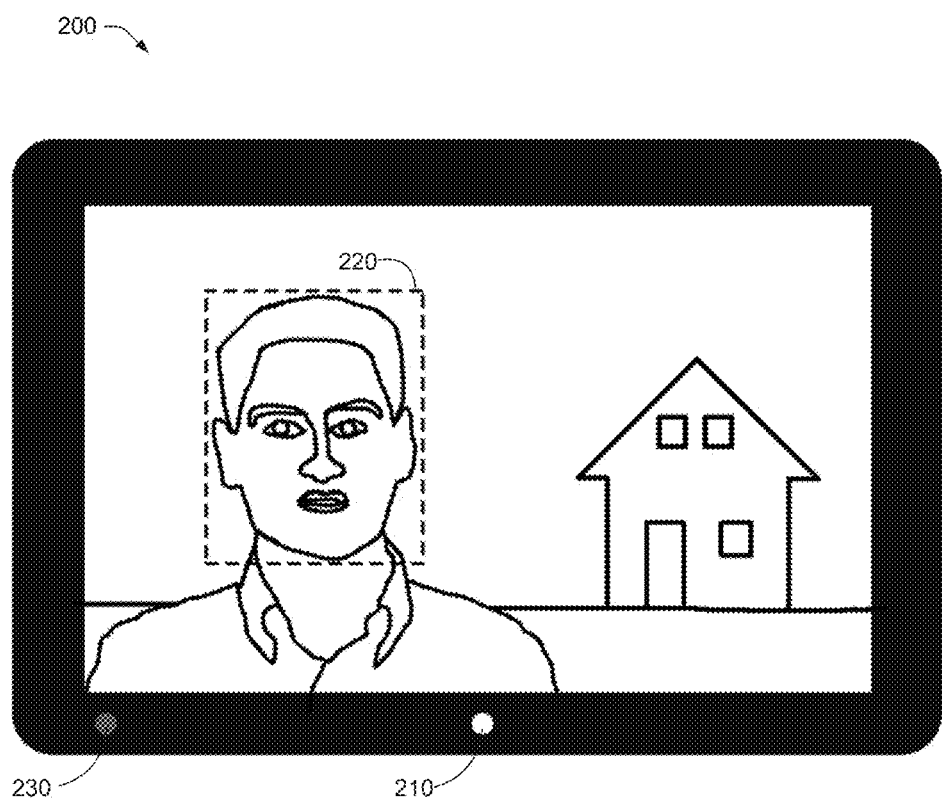
FIG. 2 is a device diagram of another example computing device capable of facilitating eye tracking control, according to some embodiments.

FIG. 2 is a device diagram of another example computing device 200 capable of facilitating eye tracking control. The computing device 200 may include a camera module 210 and one or more light sources 230. In some embodiments, the one or more light sources 230 may be infrared LEDs. For explanatory purposes, infrared LEDs may be used to describe the one or more light sources 230 throughout the disclosure. However, one of ordinary skill in the art will appreciate that any appropriate light-emitting source may be used.

The one or more cameras in camera module 210 may be placed at an appropriate distance from the light source 230 to optimize the proper capture of the infrared light.

In some example embodiments, the camera module 210 also includes a suitable type of infrared pass filter (e.g., active, mechanical, high-pass, band-pass, or any suitable combination thereof). In some example embodiments, a high-pass filter that blocks light with a wavelength below 800 nm and allows light with a wavelength above 800 nm is used. In some example embodiments, the infrared band pass filter only allows light having a wavelength between 800 and 900 nm to enter the one or more cameras of the camera module 210. In some example embodiments, the cameras in the camera module 210 include an infrared-pass filter for one set of cameras and an infrared-blocking filter for another set of cameras.

An image of the user, including the user's face region 220, may be captured by the one or more cameras of the camera module 210. The LEDs 230 may emit light that is directed toward the eyes of the user. The infrared light from the LEDs 230 may be reflected in the pupil and on the cornea of the user and recorded by the cameras in the camera module 210. In some embodiments, the LEDs 230 may be synchronized with the one or more cameras so that the LEDs 230 emit light only when the one or more cameras are taking an image and may remain off otherwise.

The LEDs 230 and the camera module 210 may be turned on or off in any manner, such as by utilizing an external slider, an on-off dedicated button on the computing device 200, an application or a digital button on the screen, or the camera module 210 may be controlled by movement or shaking of the computing device 200, controlled by voice commands, on-screen capacitive buttons, touch pads, biosignals (e.g., EMG, EEG, etc.), remote wireless control, or any suitable combination thereof. In some example embodiments, the eye tracking components consume power only while the LEDs 230 and the camera module 210 are turned on (e.g., when the user is using the eye tracking features).

In some embodiments, the eye tracking features are optimized when the camera module 210 is located at the bottom of the computing device 200 (e.g., with respect to the perspective of the user). The user may rotate the computing device 200. In some embodiments, using the accelerometer or magnetometer of the computing device 200, the LEDs 230, the pass filter, and the camera module 210 are turned on or off depending on the orientation of the computing device 200. For example, the LEDs 230 and the camera module 210 may be turned off when the computing device 200 is rotated such that the camera module 210 is located at the top of the computing device 200 with respect to the perspective of the user.

In some example embodiments, the LEDs 230 and the camera module 210 are turned off or set in low-power mode when the user's face is not detected or recognized for a predetermined amount of time (e.g., 5-10 seconds) and turn on again when the user's face is detected or recognized. For example, in a low-power mode, images may be captured at a lower frame rate, allowing the user's face to be detected if it appears, but not attempting to track the user's gaze in real-time.

In some example embodiments, the camera module 210 or the light sources 230 are included in an external device that is connected to the computing device 200 (e.g., an external docking device) instead of being located within the computing device 200. The external device may include any suitable hardware-implemented modules to perform eye tracking functions, such as hardware-implemented modules to process the images taken by the camera module 210 (e.g. a dedicated image signal processor (ISP)), control the light sources 230, or any suitable combination thereof.

Figure 3:
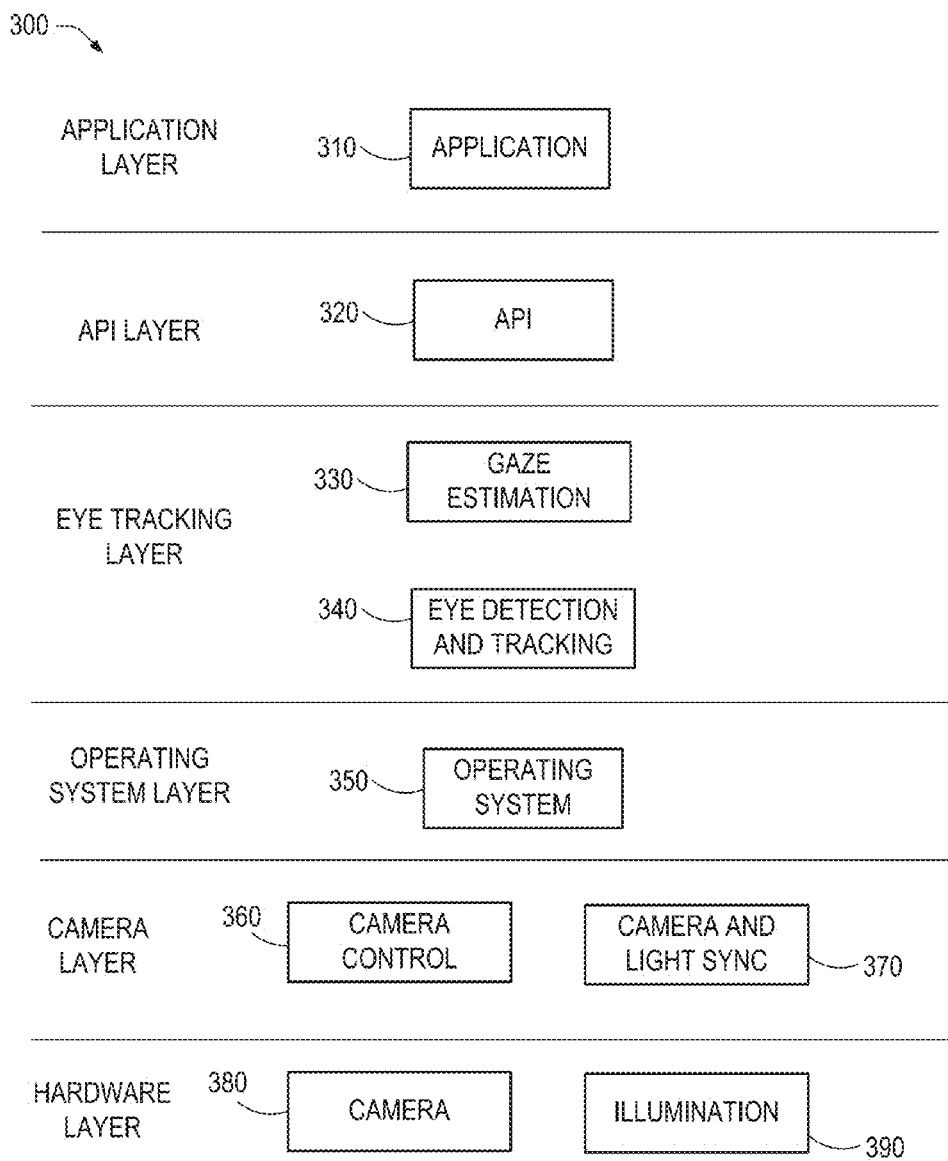
FIG. 3 is a block diagram of an example software architecture for facilitating eye tracking control, according to some embodiments.

FIG. 3 is a block diagram of an example software architecture 300 for facilitating eye tracking control. Any one or more of the components of the software architecture 300 may run on either a control processing unit (CPU) of the computing device 200 or on a combination of a CPU and a graphics processing unit (GPU) of the computing device 200. In some example embodiments, one or more of the components of the software architecture 300 run on a dedicated chip. The software may run as a background process (e.g. as part of the operating system (OS) or in a web browser) and may provide an application programming interface (API) that other applications can access. The API may fire an event or use some other similar mechanism to send the information of where the user is looking on the screen to other applications. One of ordinary skill in the art will appreciate that additional or fewer elements may be included in the example software architecture 300 shown in FIG. 3.

The software architecture 300 may be divided into different layers. The bottom layer may include a camera module 380 and an illumination module 390 that correspond to the respective hardware. A camera layer may include a camera control module 360 that is in charge of communicating with each camera in order to perform camera operations such as starting the camera, grabbing images, controlling the camera properties, or any suitable combination thereof. The camera layer may also include a camera and light sync module 370, which synchronizes the cameras and the emitters (e.g., infrared emitters) so that the lights are turned on by the eye tracking software to improve tracking of the user's eyes and minimize energy consumption. In some example embodiments, the eye tracking algorithms are used to optimize the illumination by decreasing or increasing the amount of light depending on parameters issued by the eye tracking engine. In some example embodiments, the camera layer is configured to strobe the infrared LEDs 230 at the frequency of the camera trigger output. In some example embodiments, the eye tracking software is configured to adjust the intensity of the infrared LEDs 230 based on an area of the frame being captured by the camera (e.g., the area where the face is located).

The camera layer may deliver images to the eye tracking layer or eye tracking engine. In the eye tracking layer, an eye detection and tracking module 340 may process images to find features like face location, eye region location, pupil center, pupil size, location of the corneal reflections, eye corners, iris center, iris size, or any suitable combination thereof. These features may be used by the gaze estimation module 330 in the gaze estimation stage, which may be in charge of calculating the point of regard of the user. The gaze estimation module 330 may also calculate the optical and visual axes of the user's eyes and calibrate the calculation based on specific features of the user.

The API layer may be used for communication between the eye tracking layer and applications that use eye gaze information. An API module 320 may send data calculated by the eye tracking layer, such as coordinates of the point of regard, three-dimensional (3D) location of the user's eyes, pupil size, distance between the eyes, head orientation, head movement, or any suitable combination thereof. The API module 320 may also accept commands from an application to the eye tracking layer (e.g., to start and/or stop the eye tracking engine, query for specific information, etc.). An application module 310 may connect to the eye tracker's API module 320 and use eye gaze information for any suitable purpose (e.g., control an app or a game, record eye data for future use, or any suitable combination thereof).

Figure 4:
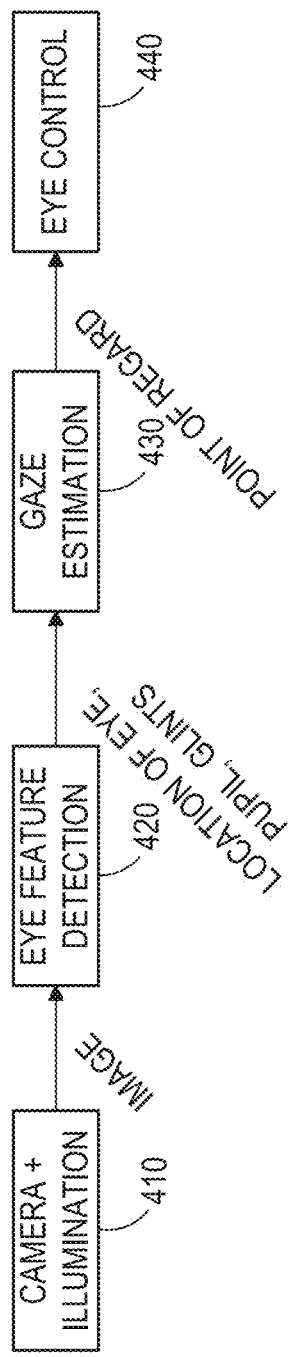
FIG. 4 is a block diagram of an example flow of data used to facilitate eye tracking control, according to some embodiments.

FIG. 4 is a block diagram of an example flow of data used to facilitate eye tracking control. The one or more cameras and the illumination modules 410 (e.g., providing illumination via infrared LEDs) may capture an image of the user. The eye feature detection module 420 may use the captured data to detect eye features (e.g., location of eye(s), pupils, corneal reflections, etc.). Using the detected eye features, the gaze estimation module 430 may estimate the user's point of regard, which may then be used to control aspects of an application through the eye control module 440.

A calibration process may be conducted when the user initially uses the eye tracking functionality in order to calculate personal parameters (e.g., vertical and horizontal offset between optical and visual axes). These personal parameters and the information of the face and eyes are then employed to estimate where the user is looking on the screen through a gaze estimation algorithm.

Figure 5A:
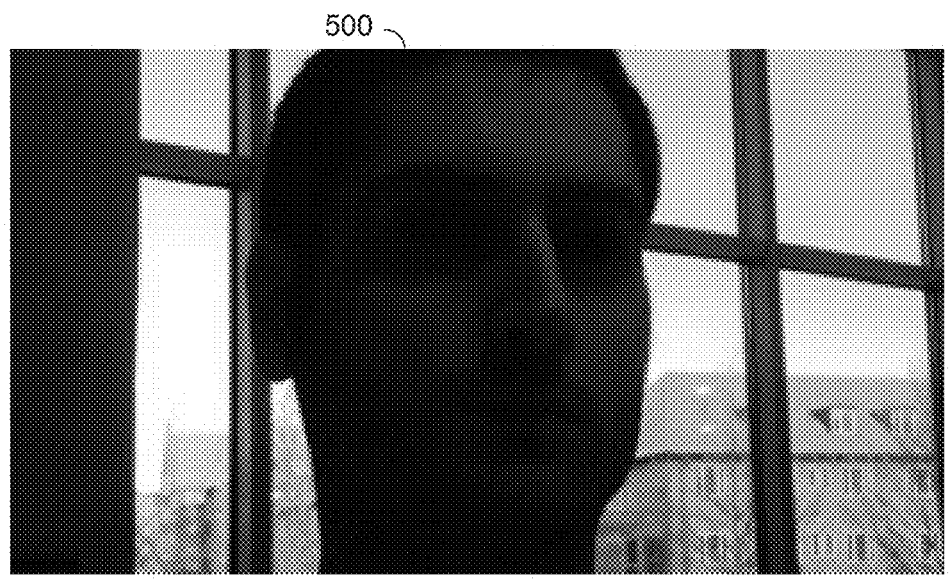
FIGS. 5A-5B are images adjusted using light modulation, according to some embodiments.
Figure 5B:
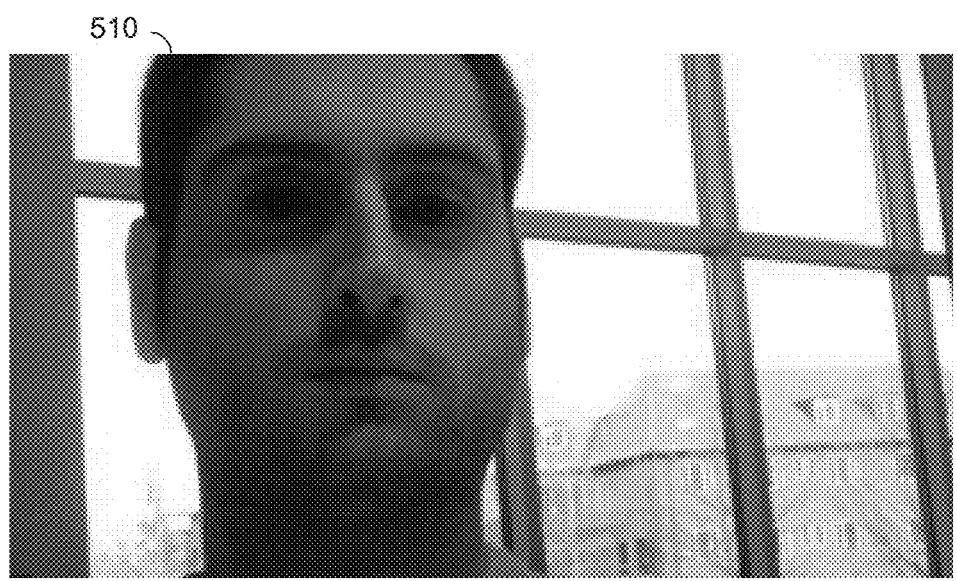

FIGS. 5A-5B are images adjusted using light modulation. In FIG. 5A, the example image 500 shown may be an image for which the automatic exposure on a camera was used, where the bright background may make the face of the subject appear too dark. In FIG. 5B, the example image 510 shown may be an image for which the exposure was set using information of the face area of the subject, as will be described in more detail below with respect to FIG. 6.

Figure 6:
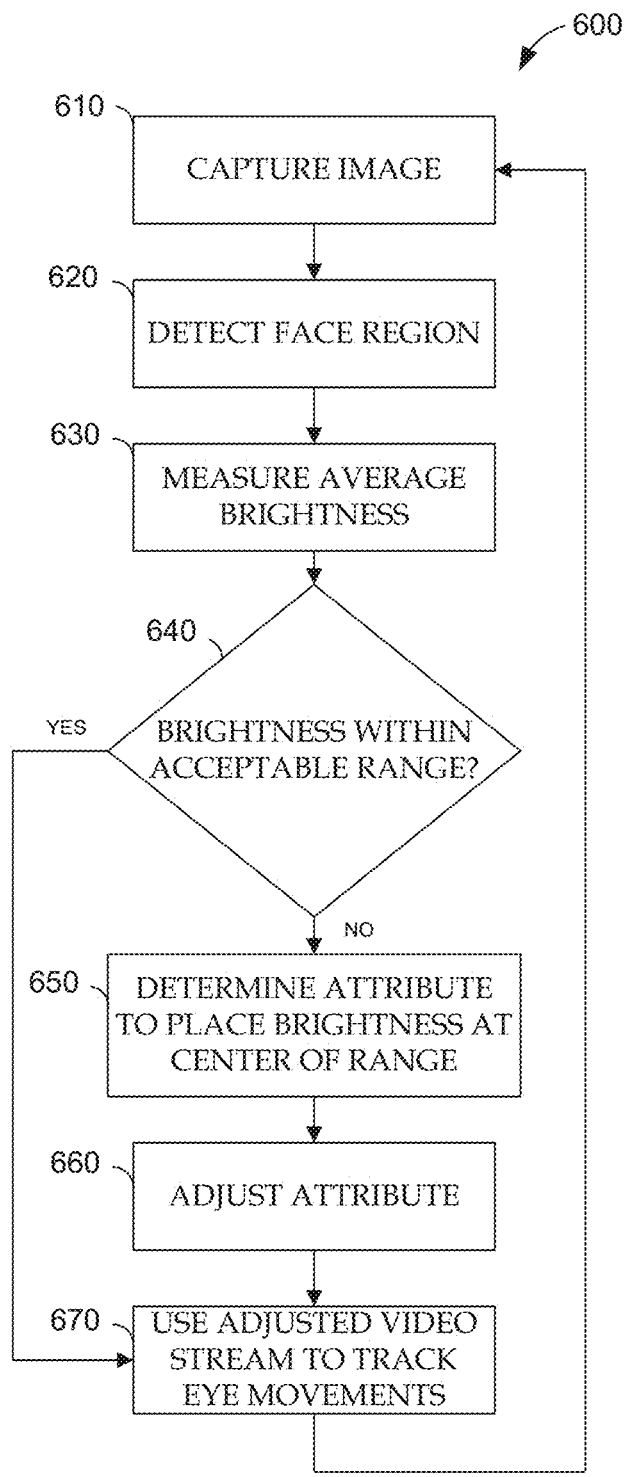
FIG. 6 is a flowchart of an example method of facilitating light modulation through exposure adjustment, according to some embodiments.

FIG. 6 is a flowchart of an example process 600 of facilitating light modulation through exposure adjustment. By way of example and not limitation, operations 610-670 are described as being performed by modules 310-390.

In operation 610, the camera of the eye tracking system, controlled by the camera module 380, captures an image of a user. The eye detection and tracking module 340 detects the face region of the user (operation 620). In operation 630, the eye detection and tracking module 340 measures the average brightness of the user's face.

In operation 640, based on the average brightness of the user's face, the eye detection and tracking module 340 determines whether the camera exposure time should be adjusted. For example, if the average brightness of the user's face is too high (too bright) or too low (too dark), the eye tracking system may determine that the camera exposure time should be adjusted.

If the camera exposure time should be adjusted, in operation 650, the eye detection and tracking module 340 determines the desired value of an attribute of the eye tracking system. For example, the desired camera exposure time of a camera of the eye tracking system may be determined. In some embodiments, this may include taking into account the ambient light, the device movement measured by a sensor of the eye tracking system, or both. For example, if the target average brightness range is 100-150 and brightness, for a particular camera, is directly proportional to the exposure time, then if the average brightness in the face region of a captured image is 60, the response time may be increased by a factor of 2.0825, placing the expected brightness at 60×2.0825=125, the center of the target range.

In operation 660, the camera control module 360 adjusts the attribute (e.g., the camera exposure time) based on the desired camera exposure determined in operation 650.

In operation 670, after the attribute is adjusted in operation 660, or if the image quality was determined to already be within the target range in operation 650, the eye detection and tracking module 340 may proceed to track eye features.

In some example embodiments, the intensity of the light emitted by the one or more active light sources 230 is modulated based on the brightness and contrast levels of the one or more facial features detected by the eye tracking software on a given image. The intensity may be modulated by adjusting certain features, such as the current flowing through the LEDs 230, by turning on and off one or more LEDs on each light source 230, by adjusting the time period during which an LED 230 is emitting light, or any suitable combination thereof. In some example embodiments, the eye tracking software finds the location and size of the face of the user and the intensity level in the face region of the image and adjusts the intensity of the light sources 230 based on this information. In some example embodiments, the eye tracking software detects the one or more pupils and irises and adjusts the intensity of the light sources 230 based on the contrast between the pupils and the irises in order to improve detection in subsequent images. In some example embodiments, the eye tracking software detects one or more corneal reflections produced by the one or more light sources 230 and adjusts the intensity of each of the light sources 230 based on the intensity level of the one or more corneal reflections in the image in order to improve detection in subsequent images. In some example embodiments, the eye tracking software combines the face and eye information with information provided by an ambient light sensor to adjust the intensity of the light sources 230.

Figure 7:
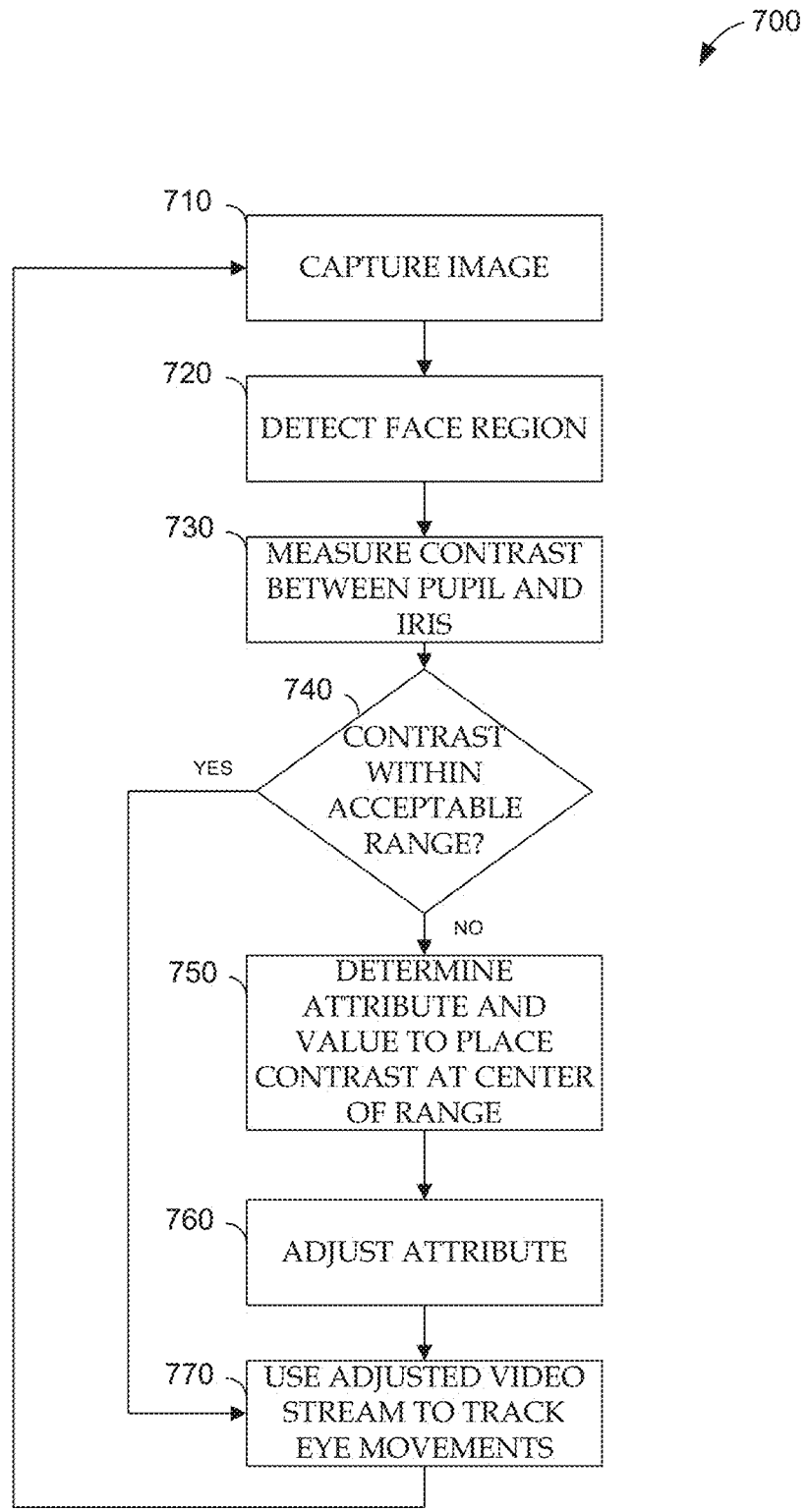
FIG. 7 is a flowchart of an example method of facilitating light modulation through light intensity adjustment, according to some embodiments.

FIG. 7 is a flowchart of an example process 700 of facilitating light modulation through light intensity adjustment. By way of example and not limitation, operations 710-770 are described as being performed by modules 310-390.

In operation 710, the camera module 380 captures an image of a user whose eye gaze and other related user features are to be detected. In operation 720, the face region of the user may be detected by the eye detection and tracking module 340. In operation 730, the contrast between the user's pupil and iris may be measured by the eye detection and tracking module 340.

In operation 740, the eye tracking system may determine whether the contrast between the user's pupil and iris is within the target range. For example, if the contrast between the user's pupil and iris is too low or too high, the eye tracking system may determine that the contrast between the user's pupil and iris should be adjusted.

If the contrast between the user's pupil and iris should be adjusted, in operation 750, the eye detection and tracking module 340 determines the desired value of an attribute of the light sources or cameras of the eye tracking system. For example, the light intensity of the light sources of the eye tracking system may be the selected attribute. In some example embodiments, this includes turning on or off one or more light sources. In some example embodiments, this includes taking into account the ambient light, the device movement measured by a sensor of the eye tracking system, or both. For example, if the contrast between the pupil and the iris is measured at 10, the target range is 25-50, and adding an additional light source is expected to increase the contrast by 20, a determination to add an additional light source (raising the expected contrast to 30, within the target range) may be made.

In operation 760, the camera control module 360 or illumination module 390 adjusts the light intensity based on the desired light intensity determined in operation 750.

In operation 770, after the light intensity is adjusted in operation 760, or if the contrast between the user's pupil and iris was determined to already be within the target range in operation 740, the eye tracking system proceeds with using the eye tracking software to track eye features.

Figure 8:
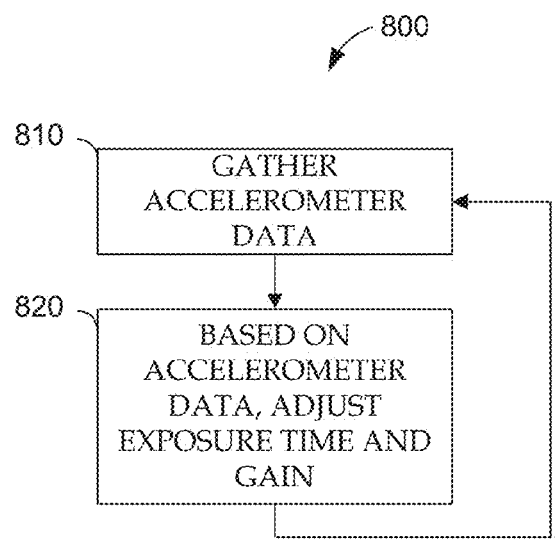
FIG. 8 is a flowchart of an example method of facilitating light modulation through exposure time and gain adjustment, according to some embodiments.

FIG. 8 is a flowchart of an example process 800 of facilitating light modulation through exposure time and gain adjustment, according to some example embodiments. By way of example and not limitation, the operations of the process 800 are described as being performed by the modules 310-390 of a computing device 1100.

In operation 810, an accelerometer (which is one example of the sensor device 1018) reports acceleration data to the camera control module 360. Based on the acceleration data, the camera control module 360 adjusts the exposure time and gain used to capture images (operation 820). For example, when no motion is detected, a base exposure time length and base gain are used. When motion is detected, the base exposure time may be long enough that the captured image will be blurred. Accordingly, the camera control module 360 reduces the exposure time to reduce or eliminate the blurring. However, reduced exposure time reduces the total amount of incident light received by the camera while capturing the image. Accordingly, the gain (i.e., light amplification factor) is adjusted to partially or wholly compensate. For example, if the exposure time is reduced by 50%, the gain may be doubled to compensate. The particular relationship between the gain and the exposure time may vary on a camera by camera basis.

The process 800 may be performed continuously, such that once the exposure time and gain are adjusted in operation 820, the process begins again with operation 810, to continue to monitor acceleration of the device. Alternatively, the process 800 may be triggered by a request to capture a single image, and end once operation 820 is complete.

Figure 9:
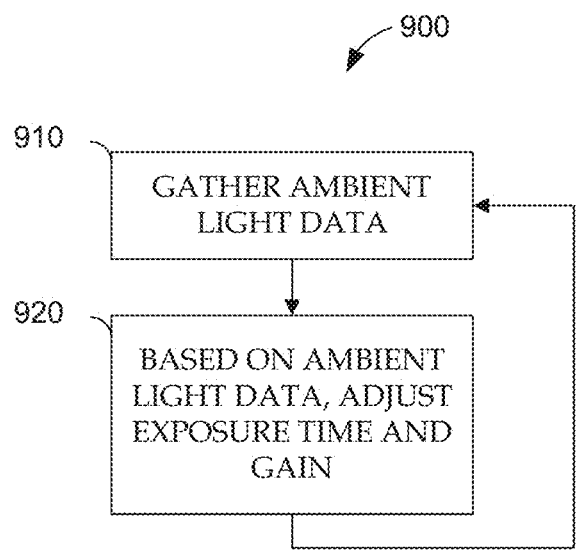
FIG. 9 is a flowchart of an example method of facilitating light modulation through exposure time and gain adjustment, according to some embodiments.

FIG. 9 is a flowchart of an example process 900 of facilitating light modulation through exposure time and gain adjustment, according to some embodiments. By way of example and not limitation, the operations of the process 900 are described as being performed by the modules 310-390 of a computing device 1100.

In operation 910, a light sensor (which is one example of the sensor device 1018) reports data regarding the amount of ambient light (e.g., in lumens) to the camera control module 360. Based on the ambient light data, the camera control module 360 adjusts the exposure time and gain used to capture images (operation 820). For example, when a typical level of outdoor light is detected, a base exposure time length and base gain are used. When reduced light is detected, the base exposure time and gain may cause the resulting image to be too dark and have insufficient contrast for feature detection. Accordingly, the camera control module 360 increases the exposure time, the gain, or both to improve the image quality. Information from the light sensor may be combined with image information, such as overall or local brightness information.

The process 900 may be performed continuously, such that once the exposure time and gain are adjusted in operation 920, the process begins again with operation 910, to continue to monitor acceleration of the device. Alternatively, the process 900 may be triggered by a request to capture a single image, and end once operation 920 is complete. LED intensity may also be adjusted using information provided by an ambient light sensor. If the values provided by the sensor indicate a dark environment, the intensity of the illumination may be reduced in order to save power. If the light sensor detects an environment with a high level of ambient light (e.g. the person is outdoors), the intensity of the LEDs may be increased so that the face and eye features (pupil, glints, etc.) can be detected more robustly by the eye tracking software.

The processes 800 and 900 may be performed in combination, such that the exposure time and gain depends on both the detected acceleration of the device 100 and the ambient light.

Figure 10:
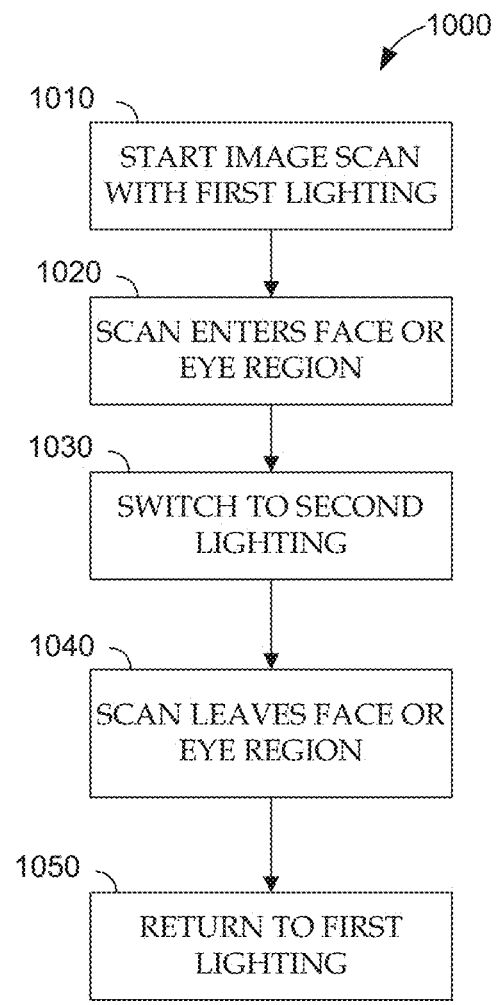
FIG. 10 is a flowchart of an example method of facilitating light modulation for particular regions of an image, according to some embodiments.

FIG. 10 is a flowchart of an example process 1000 of facilitating light modulation for particular regions of an image, according to some embodiments. By way of example and not limitation, the operations of the process 1000 are described as being performed by the modules 310-390 of a computing device 1100.

In operation 1010, an image scan is begun with a first lighting. For example, one set of LEDs in the device may be turned on while the remaining LEDs are turned off. As another example, all LEDs may remain off in order to conserve battery.

In operation 1020, the image scan enters the face or eye region. For example, a rolling shutter sensor may be used, which captures the image line-by-line. From previous image scans, the eye detection and tracking module 340 knows the expected location of the eye (or face) within the image scan. The rolling shutter sensor can generate a signal to indicate the completion of each scanned line. Accordingly, the line currently being scanned can be determined from the information provided by the rolling shutter sensor. When the image scanning enters the first expected line of the eye (or face), the computing device 1100 switches to the second lighting (operation 1030). For example, one or more of the LEDs in the first set of LEDs may be turned off, one or more of the remaining LEDs may be turned on, or both. As another example, one or more LEDs may be turned on in order to obtain an image where the face or eye region has optimal illumination.

In operation 1040, the image scan leaves the face or eye region. Determination of this event can occur as described above using the information from the rolling shutter sensor and the expected lines occupied by the eye (or face) as reported by the eye detection and tracking module 340. When the image scanning leaves the last expected line of the eye (or face), the computing device 1100 returns to the first lighting (operation 1050). For example, all sets of LEDs may be turned off in order to conserve battery.

Although the process 1000 is described above with respect to intra-frame lighting based on detection of a face or eye region, other detected objects could be used to control the lighting.

Certain embodiments are described herein as including logic or a number of components, modules, or mechanisms. Modules may constitute hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 11:
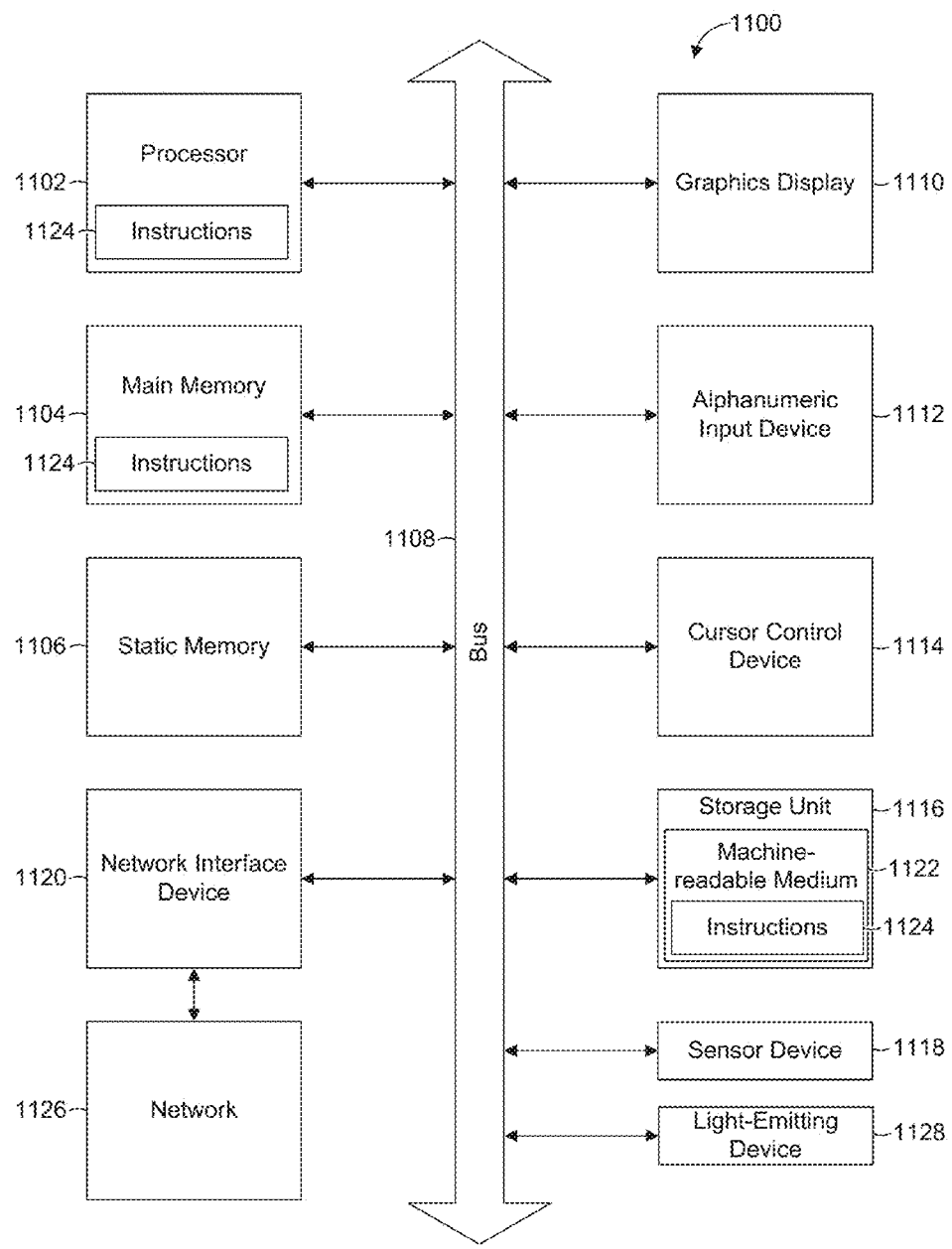
FIG. 11 is a block diagram of a machine in the example form of a computer system within which a set of instructions, for causing the machine to perform any one or more of the methodologies discussed herein, may be executed, according to some embodiments.

FIG. 11 is a block diagram of a machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1100 includes a processor 1102 (e.g., a central processing unit (CPU), a graphics processing unit (GPU) or both), a main memory 1104, and a static memory 1106, which communicate with each other via a bus 1108. Computer system 1100 may further include a video display device 1110 (e.g., a liquid crystal display (LCD) or a cathode ray tube (CRT)). Computer system 1100 also includes an alphanumeric input device 1112 (e.g., a keyboard), a cursor control device 1114 (e.g., a mouse or touch sensitive display), a disk drive unit 1116, a sensor device 1118 (e.g., a camera, an accelerometer, a magnetometer, a light meter) a network interface device 1120, and a light emitting device 1128 (e.g., one or more LEDs).

Disk drive unit 1116 includes a machine-readable medium 1122 on which is stored one or more sets of instructions and data structures (e.g., software) 1124 embodying or utilized by any one or more of the methodologies or functions described herein. Instructions 1124 may also reside, completely or at least partially, within main memory 1104, within static memory 1106, and/or within processor 1102 during execution thereof by computer system 1100, main memory 1104 and processor 1102 also constituting machine-readable media.

While machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Instructions 1124 may further be transmitted or received over a communications network 1126 using a transmission medium. Instructions 1124 may be transmitted using network interface device 1120 and any one of a number of well-known transfer protocols (e.g., hypertext transport protocol (HTTP)). Examples of communication networks include a local area network ("LAN"), a wide area network ("WAN"), the Internet, mobile telephone networks, plain old telephone system (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   capturing a first image using a camera of an eye tracking device;
   detecting a face region of the first image, the face region depicting the face and eye features of a user;
   based on at least a portion of the face region, measuring a parameter of the first image, wherein the parameter is a value representing a visual property of the first image;
   based on the value of the parameter of the first image being outside of a target range of parameter values, adjusting an attribute associated with the eye tracking device to improve detection of the eye features for use by an eye tracking algorithm, wherein the attribute is a value representing a setting of the eye tracking device having an effect on images captured by the camera, and wherein adjusting the attribute comprises determining a value for the attribute that places the value of the parameter at a center of the target range;

after adjusting the attribute associated with the eye tracking device, capturing a second image using the camera of the eye tracking device; and performing the eye tracking algorithm on the second image to determine, using the eye tracking device, a gaze direction of the user based on detected eye features in the second image.

2. The method of claim 1, wherein measuring the parameter of the first image comprises measuring a contrast of the first image.

3. The method of claim 1, wherein measuring the parameter of the first image comprises measuring a brightness of the first image.

4. The method of claim 1, wherein measuring the parameter of the first image comprises attempting to detect facial features of the user.

5. The method of claim 1, wherein the attribute is a camera exposure time of the camera.

6. The method of claim 1, wherein the attribute is a camera gain of the camera, the camera gain specifying a light amplification factor of the camera.

7. The method of claim 1, wherein the attribute is a camera f-number of the camera, the camera f-number specifying a ratio between a focal length and an entrance pupil diameter of the camera.

8. The method of claim 1, wherein the attribute is a camera frame rate of the camera.

9. The method of claim 1, wherein the attribute is a light intensity of a light source of the eye tracking device.

10. A computing device comprising:
a camera module configured to capture images;
an attribute adjustment module configured to:
receive a first image captured by the camera module;
detect a face region of the first image, the face region depicting the face and eye features of a user,
based on at least a portion of the face region, measure a parameter of the first image, wherein the parameter is a value representing a visual property of the first image, and
based on the value of the parameter of the first image being outside of a target range of parameter values, adjust an attribute associated with the camera module to improve detection of the eye features for use by an eye tracking algorithm, wherein the attribute is a value representing a setting of the eye tracking device having an effect on images captured by the camera, and wherein adjusting the attribute comprises determining a value for the attribute that places the value of the parameter at a center of the target range; and an eye tracking module configured to:
receive a second image captured by the camera module, the second image captured after adjusting the attribute associated with the camera module, and
perform the eye tracking algorithm on the second image to determine a gaze direction of the user based on detected eye features in the second image.

11. The computing device of claim 10, further comprising a light source module configured to emit light while the images are captured.

12. The computing device of claim 10, wherein measuring the parameter of the first image comprises measuring a contrast of the first image.

13. The computing device of claim 10, wherein measuring the parameter of the first image comprises measuring a brightness of the first image.

14. The computing device of claim 10, wherein measuring the parameter of the first image comprises attempting to detect facial features of the user.

15. The computing device of claim 10, wherein the attribute is a camera exposure time of the camera module.

16. The computing device of claim 10, wherein the attribute is a camera gain of the camera module, the camera gain specifying a light amplification factor of the camera module.

17. The computing device of claim 10, wherein the attribute is a camera f-number of the camera module, the camera f-number specifying a ratio between a focal length and an entrance pupil diameter of the camera module.

18. A non-transitory machine-readable storage medium storing instructions which, when executed by one or more processors, cause the one or more processors to perform operations comprising:
capturing a first image using a camera of an eye tracking device;
detecting a face region of the first image, the face region depicting the face and eye features of a user;
based on at least a portion of the face region, measuring a parameter of the first image, wherein the parameter is a value representing a visual property of the image;
based on the value of the parameter of the first image being outside of a target range of parameter values, adjusting an attribute associated with the eye tracking device to improve detection of the eye features for use by an eye tracking algorithm, wherein the attribute is a value representing a setting of the eye tracking device having an effect on images captured by the camera, and wherein adjusting the attribute comprises determining a value for the attribute that places the value of the parameter at a center of the target range;
after adjusting the attribute associated with the eye tracking device, capturing a second image using the camera of the eye tracking device; and
performing the eye tracking algorithm on the second image to determine, using the eye tracking device, a gaze direction of the user based on detected eye features in the second image.

19. The method of claim 1, wherein the parameter is an average brightness of the face region of the first image, wherein the attribute is a camera exposure time of the camera, and wherein determining a value for the attribute that places the value of the attribute at a center of the target range comprises:
computing a scale factor between a center value of a target average brightness range and the average brightness of the face region in the first image; and
determining a value for a camera exposure time for the second image by scaling a camera exposure time of the first image by the scale factor.

20. The method of claim 1, wherein the parameter is a contrast between a pupil of the user depicted in the first image and an iris of the user depicted in the first image, wherein the attribute is a light intensity of one or more light sources of the eye tracking device, and wherein determining a value for the attribute that places the value of the attribute at a center of the target range comprises:

responsive to determining that the contrast between the pupil and the iris in the first image is lower than a target contrast range, increasing the light intensity of one or more light sources.

* * * * *